(No Model.) 6 Sheets—Sheet 3.
J. A. KEYES.
COIN OPERATED MACHINE.
No. 539,520. Patented May 21, 1895.

WITNESSES: INVENTOR
James A. Keyes,
BY
Geo. H. Graham
ATTORNEY

(No Model.) 6 Sheets—Sheet 4.

J. A. KEYES.
COIN OPERATED MACHINE.

No. 539,520. Patented May 21, 1895.

Witnesses
W. H. Graham.
N. Marler

Inventor
James A. Keyes,
By his Attorney
Geo. H. Graham (No Model.) 6 Sheets—Sheet 5.

J. A. KEYES.
COIN OPERATED MACHINE.

No. 539,520. Patented May 21, 1895.

WITNESSES:
W. H. Graham
N. Marler

INVENTOR
James A. Keyes,
BY
Geo. H. Graham
ATTORNEY (No Model.)
6 Sheets—Sheet 6.

J. A. KEYES.
COIN OPERATED MACHINE.

No. 539,520. Patented May 21, 1895.

Witnesses
W. H. Graham
N. Marler

Inventor
James A. Keyes
By his Attorney
Geo. H. Graham

UNITED STATES PATENT OFFICE.

JAMES A. KEYES, OF NEW YORK, N. Y., ASSIGNOR, BY MESNE ASSIGNMENTS, TO THE STAR AUTOMATIC SALES COMPANY, OF DETROIT, MICHIGAN.

COIN-OPERATED MACHINE.

SPECIFICATION forming part of Letters Patent No. 539,520, dated May 21, 1895.

Application filed June 22, 1892. Serial No. 437,633. (No model.)

*To all whom it may concern:*

Be it known that I, JAMES A. KEYES, of the city, county, and State of New York, have invented certain new and useful Improvements in Coin-Operated Machines, of which the following is a specification, reference being had to the accompanying drawings, forming a part thereof.

This invention relates to that class of vending mechanism by which the services of a salesman are dispensed with and the successive individuals of a series of articles, such as cigars, postage stamps, candy-tablets, &c., are fed out by the apparatus or placed in condition to be fed out upon the dropping of the proper coin in the slot of the machine.

One practical difficulty encountered heretofore in the operation of this class of machines has been the fact that spurious coin, or metallic washers of the proper size would cause them to operate as well as the genuine coin, and thus malicious and mischievous persons have been enabled to secure large quantities of the material vended by the machines without leaving the proper equivalent therefor in the money drawer. It is the object of my invention to prevent this operation of the vending apparatus by substitutes for the proper coin. It acts as an automatic separator of genuine from spurious coin and it throws out automatically and may return to the purchaser any coin of wrong denomination, or any counterfeit of or substitute for the proper coin by which he may have attempted to operate the machine.

The general principle upon which one part of my invention depends is that a metallic coin of the usual alloys employed in coinage, will rebound smartly if dropped upon a hard metallic surface, while a badly plugged coin, a lead nickel and other substitutes for genuine coins, will not so rebound. The first exercise of this function as an automatic separator of genuine from spurious coin is derived from this principle. To this end I provide a vertical or substantially vertical coin chute with a hard metallic surface, preferably slightly inclined, at the bottom, and the rebounding or failure to rebound of the coin dropped down this chute determines which of two paths it shall take, whether it shall pass on to the other portions of the mechanism and do its work or remain at the bottom of the above mentioned chute until removed by subsequent operations, or pass automatically out of the machine.

Other portions of the mechanism are dependent for their successful operation on the coin, or the substitute offered therefor, being of the proper thickness, roughness, diameter, &c., and in default of these requirements being properly fulfilled, the delivery mechanism of the vending apparatus will not work but the coin will be returned to the customer, or held in a special receptacle for such coin.

The preferred form of mechanism for carrying out my invention is illustrated in the accompanying drawings, in which—

Fig. 6ª is a plan view of the coupling-disks with a coin in position; and Fig. 6ᵇ is a vertical section on the line 6ᵇ of Fig. 6ª, showing the coin between the coin-holding jaws. Fig. 7ª is a plan view of the coupling-disks in a like position with a coin interposed.

Throughout the specification the same reference figures and letters refer to the same parts.

Figure 1:
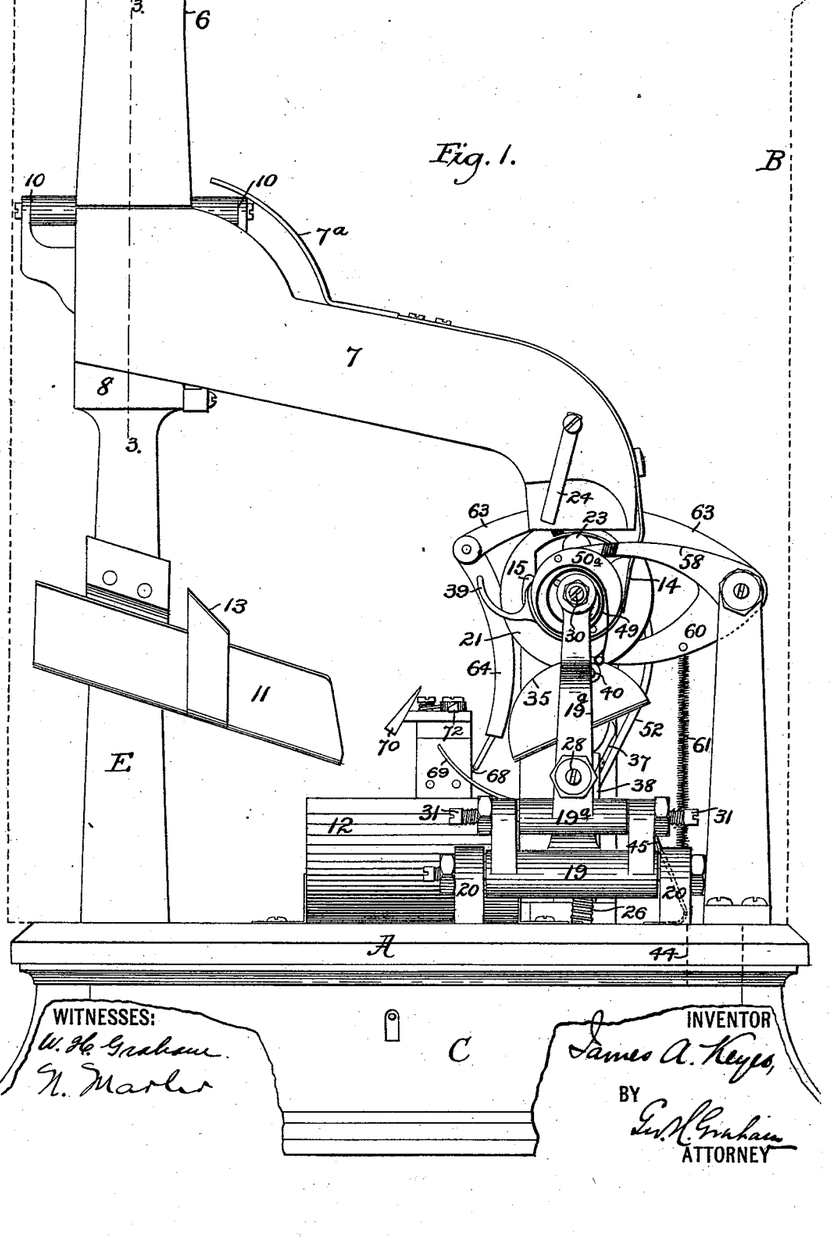
Figure 1 is a side elevation of the coin-handling mechanism, the goods-delivery apparatus having been removed.

The machine is mounted on a suitable base A and inclosed by a casing B, indicated by dotted lines Fig. 1, that covers the operative parts of the mechanism, and which may be removed for purposes of examining the same. The base carries a money drawer C which may be locked and the key removed by the owner of the machine or agent. The base also carries a delivery drawer D into which the postage stamps are dropped by the delivery mechanism, or, in the present form, in case a bad coin has been introduced into the machine, the said bad coin is deposited in such delivery drawer in place of the postage stamps which would have been found there if genuine coin of the proper denomination had been used. The delivery drawer, or the opening in the base coinciding therewith, is provided with an automatic apron 5 for preventing articles from falling behind the delivery drawer when the latter is open. When the delivery drawer is open, should the machine be then operated, the postage stamps or bad coins fall on this apron to be temporarily supported thereby, and when the drawer is shut the apron tilts and deposits them in it, from which the purchaser may take the stamps or other articles.

Figures 2, 3:
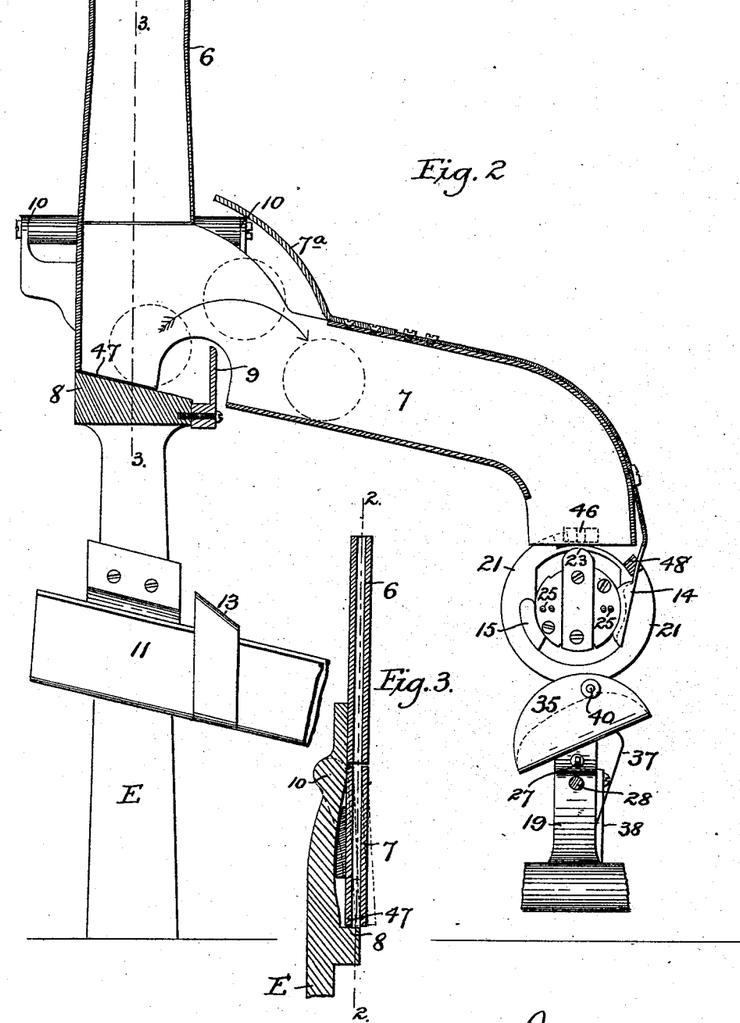
Fig. 2 is a vertical section through the center of the coin-chutes in the plane of Fig. 1 and line 2 2 of Fig. 3.
Fig. 3 is a vertical section on line 3 3 of Figs. 1 and 2 through the vertical coin-chute, showing the shunt for getting rid of dead or non-elastic coin.

The machine is provided with a vertical or substantially vertical coin chute 6, see Figs. 1, 2 and 3, whose upper end protrudes through the casing B or registers with a slot in said casing. It is also provided with an inclined coin chute 7 whose upper end is arranged at or near the base of the vertical coin chute; and below the bottom of the vertical coin chute there is a rigid inclined base 8, arranged so that any coin dropping down the chute will strike on this base. There is provided a partition 9, partly shutting off the entrance to the second coin chute 7 so that unless the coin rebounds from the rigid base a distance greater than the height of the partition 9, it cannot enter the inclined coin chute 7. The inclined coin chute is provided with a guard 7ª on its upper surface, which guides the jumping coin down the chute 7 and prevents it from jumping out of the chute should it rebound too much. The rigid base 8 is arranged at the upper end of a standard E in an inclined position with respect to the longitudinal axis of the vertical coin chute so that the tendency of the coin will be to rebound in the direction of the incline and over the partition 9 as is clearly indicated in Fig. 2, by the dotted circles and curved arrow. The inclined coin chute is provided with a hinge 10 connecting it to some stationary part of the machine, as for instance to the stationary coin chute, or to an arm rising from the standard E in rear of the rigid base, as shown in Fig. 3, and by means of this hinge the inclined chute is capable of oscillating bodily thereon.

Below the rigid base 8, there is mounted an inclined trough 11, forming a dead coin conductor, for catching the dead coin removed from the rigid base 8 and discharging it into the hopper 12 that coincides with the opening to the delivery drawer D. The inclined trough 11 may be provided with a guard 13 to prevent the dead coins from jumping out of their conductor. The upper rear side of the inclined coin chute is provided with a discharging lip 47 normally occupying a position in rear of the bend where the dropped coin meets the rigid base 8 and adapted to sweep over the surface of said rigid base when the inclined chute is oscillated on its hinge by the operation of other parts of the apparatus. The effect of such oscillation will obviously be to sweep any dead coin that may remain on the base off, and permit it to fall into the dead conductor 11.

The rigid base 8 in connection with the coin chutes forms an efficient means of sorting spurious coin from the genuine, and when combined with an automatic mechanism is adapted to permit the genuine coin to pass onward to perform its function in effecting the operation of said mechanism, while holding the spurious coin back so that it may be directed out of the machine or into a special receptacle for the purpose.

The lower end of the inclined chute is provided with a spring projection 14 which serves as one of a pair of coin holding jaws and as said jaw vibrates with the oscillation of the chute 7, it is herein termed the "vibrating coin holding jaw." The other member 15 of the pair of coin holding jaws is mounted on the face of a revoluble disk 21, and as it rotates with said disk, it is herein termed the "rotating coin holding jaw."

The customer operates the machine by a crank 16 located outside of the inclosing case. See Figs. 4, 5 and 7. The main crank shaft 17 to which said crank is connected is supported in bearings in a standard 17ª, and in longitudinal line with said crank shaft there is provided an auxiliary shaft 18. This auxiliary shaft is indirectly mounted on a vibrating frame 19 that is carried at its lower end in bearings 20 on the base of the machine, and is adapted to rock bodily in said bearings to the right and left for a purpose to be hereinafter explained.

Mounted on one extremity of the main shaft is one disk 21 of the pair of disks, forming a coin-coupler; and the corresponding disk 22 is mounted on the adjacent extremity of the auxiliary shaft 18. The face of the disk 21 is formed with a coin guide 23, which acts in conjunction with a yielding coin guide 14, that is mounted on and projects from the lower end of the coin chute 7 so as to guide the falling coin between the disks 21, 22, forming the coin-coupler. The coin thus guided is held between said disks by the action of the holding jaws 14 and 15, see Fig. 6$^b$, in position to be seized by oppositely projecting points 25, set in and projecting on the opposed faces of the disks 21, 22. As these seizing points are gaged with exactness so as to grasp only coins of the required thickness, they are termed herein "gaging points" of the coin-coupler. These gaging points are also adapted to take into the hollows in the embossed surface of the coin whereby as will hereinafter appear the auxiliary shaft carrying the disk 22 is caused to revolve; and in the absence of an embossed surface on the coin or spurious coin that has entered between the disks, the points of the disk 22 not taking into any depressions but on the contrary abutting against a smooth surface, the auxiliary shaft and disk 22 will fail to rotate.

Figure 4:
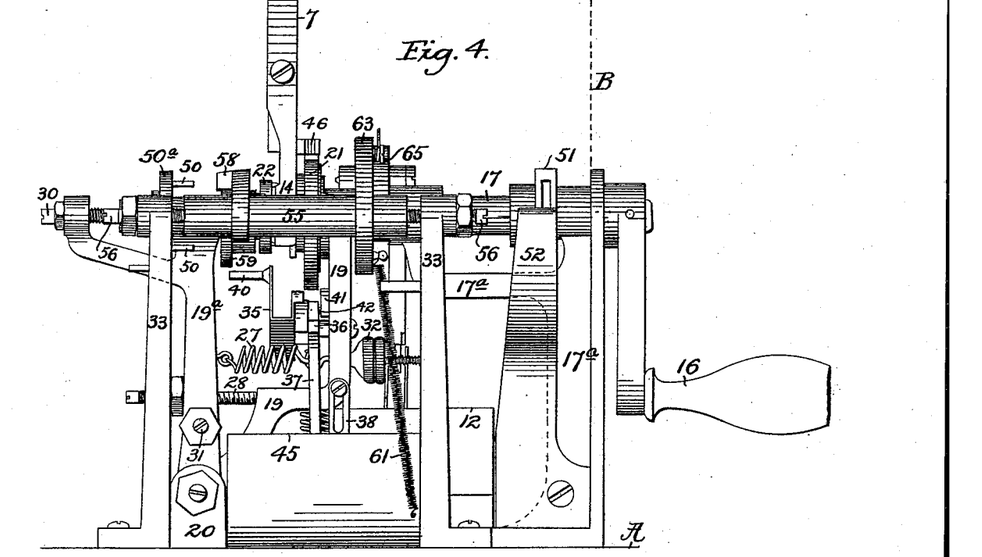
Fig. 4 is an end elevation of the coin-gripping or coupler portion of the apparatus and its immediate connections looking from the right of Fig. 1.
Figure 5:
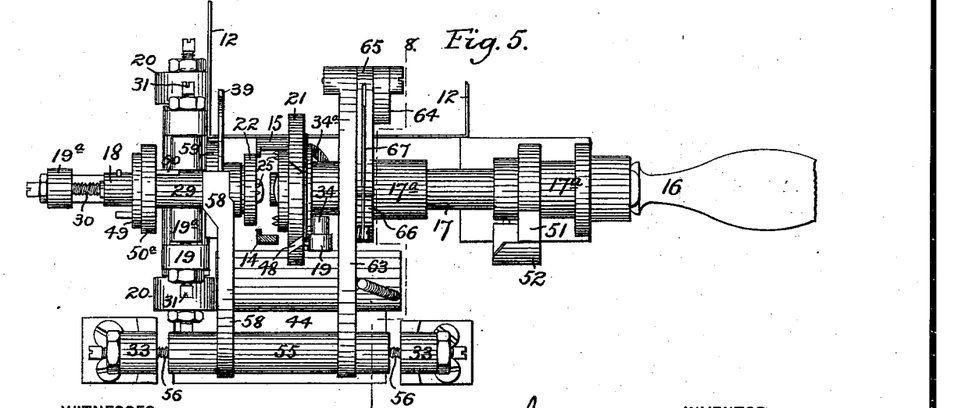
Fig. 5 is a plan view of the same, the coin-chute being omitted.
Figures 6, 7, 13, 14:
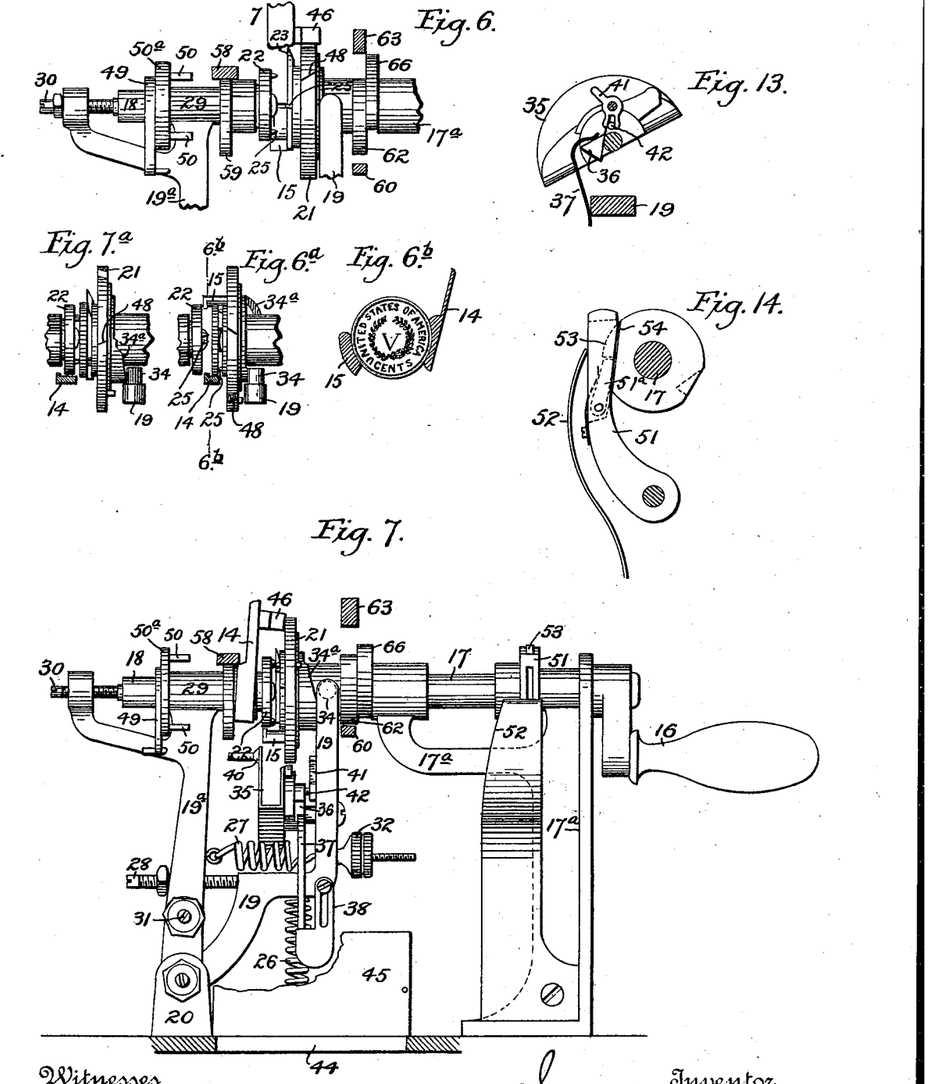
Fig. 6 is an elevation of the upper portion of the devices shown in Fig. 4 in the position of Fig. 4, showing particularly the coin-gripping or coupling devices.
Fig. 7 is a similar view, more complete, the parts being moved and the crank turned about forty-five degrees of revolution.
Fig. 13 is a side elevation of the coin-chute 35 and immediate parts.
Fig. 14 is a sectional elevation of the crank-shaft, stop-pawl, tooth, and cam.

The vibrating frame 19 is borne upon by a spiral spring 26 that tends to vibrate it to the left on its bearings 20. This vibrating frame carries an adjustable arm 19$^a$ that is mounted in said frame between centers 31 and is controlled in its position with respect to the frame 19 by a spring 27 pulling to the right and by an adjustable stop screw 28 limiting such movement, and as shown in Figs. 4 and 7. The upper end of the arm 19$^a$ is provided with a journal 29 in which is mounted the auxiliary shaft 18; the position of said shaft being determined and the space between the disks 21, 22, regulated by an adjustable backing screw 30. The spring 27 is increased or diminished in power by a screw and its adjusting nut 32. The vertical member of the vibrating frame 19 is provided at its upper end with a cam roll 34, projecting in the path of a cam 34$^a$ formed on the back of the disk 21, which as the disk with its cam rotates causes the frame 19 and its arm 19$^a$ to vibrate to the right so as to move the disk 22 up toward the disk 21.

Figures 10, 12:
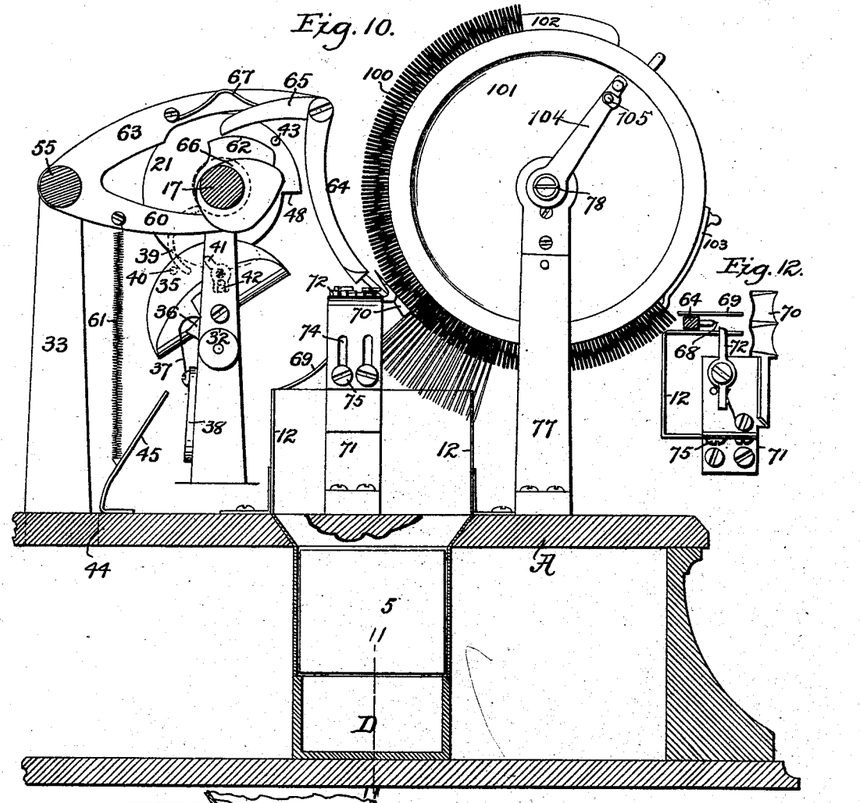
Fig. 10 is a similar view to Fig. 7 with the mechanisms in the position they occupy at that stated time when a genuine coin is in the coin-coupler and the impaling-needle has been moved ready to impale the stamp or a couple of stamps to feed the same outward.
Fig. 12 is a plan view of the stamp-stripper, stop, and detent.
Figure 11:
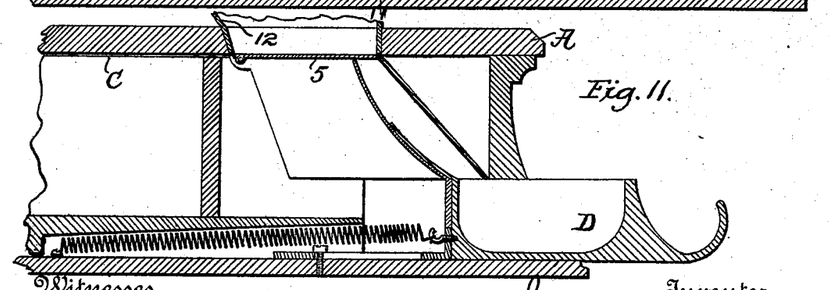
Fig. 11 is a central vertical section on the line 11 of Fig. 10, showing the delivery-drawer open and the apron in its upper position.

Immediately below the space between the coupling disks 21, 22, there is pivotally mounted to the vibrating frame 19 a tilting coin chute 35, which may be tilted in one direction as shown in Figs. 10 and 13 to deliver coins into the money drawer C, and in the other direction as shown in Figs. 1, 2, 8 and 9, to drop them into the dead coin hopper 12. The tilted coin chute is held in either position by the cam tooth 36 formed on the side of said chute with either of the faces of which tooth a spring 37 coacts to hold the chute in either of its moved positions until it is positively moved by the application of force from some moving portion of the machine. The spring 37 is carried by an adjustable support 38.

The auxiliary shaft 18 carries a cam projection or finger 39, which when said shaft is rotated comes against and strikes the pin 40, projecting from the side of the tilting chute and tips said chute toward an opening 44 in the machine base, so that if there should be a coin in said chute it will drop therefrom and pass into the money drawer C. The coin chute 35 also carries a pin 42 that engages with the perforated end of a pawl 41, pivoted to the side of the frame 19, through the medium of which the chute is tipped back to its normal position shown in Figs. 1 and 2, by the passage of a pin 43 that projects from the back of the disk 21, and in this position is adapted to discharge the dead coin that may fall therein into the dead coin hopper 12.

Adjacent the opening 44 there is arranged an inclined guide 45 that directs the coin from the coin chute into the opening 44.

From the foregoing it will be seen that whenever the auxiliary shaft is caused to rotate by the engagement of its points 25 with the depressions of the embossed surface of a genuine coin on the rotation of the crank shaft and the disk 21, as in Figs. 6$^b$ and 7$^a$, the finger 39 will also be rotated so as to strike the pin 40 on the side of the coin chute 35 and tilt it into the position shown in Figs. 10 and 1, to direct the genuine coin through the opening 44 into the cash drawer, and that this tilting of the coin chute into such position only occurs when the auxiliary shaft is rotated by the presence of a genuine coin in the coin-coupler. On the other hand, if a spurious coin should pass to the coin-coupler and lack the embossed surface for engagement of the points 25 of the disk 22, the disk 21 only will be rotated and hence the coin chute 35 will not have been tilted from its normal position; but should it have been tilted by the previous operation while a genuine coin was in position in the coin-coupler, the pin 43 will in the rotation of the disk 21 strike the upper end of the pawl 41, and thereby rock it so as to cause the coin chute to be tilted in the opposite direction so as to be in position to deliver a dead or spurious coin into the hopper 12. It will also be noticed that the connection between the vibrating frame 19 and its arm 19$^a$ carrying the auxiliary shaft 18, is a yielding one formed by the spring 27, which when the frame and arm are rocked to the right as in Figs. 7 and 7$^a$ will allow the arm and with it the disk 22 to yield correspondingly to the thickness of the coin that may be present in the coin-coupler, and hence should the points 25 of the disks fail to enter the depressions of the embossed surface of the coin; when the disks first clamp the coin, the points 25 may finally become seated in the depressions during the early movement of the shaft 17 by the pull of said spring 27.

It is obvious that any method or means of moving a dead coin from the surface of the rigid base 8 may be employed; but in the present case, as before explained, this removal is effected by the oscillation of the inclined coin chute 7, and hence there is provided means by which said coin chute is rocked for this and another purpose. To this end the back of the lower end of the inclined chute 7 is provided with a cam projection 46, see Figs. 2, 4 and 7, that normally lies in a cam recess 48 formed in the periphery of the disk 21, so that whenever the main shaft 17 is rotated, the cam 48 strikes the cam projection 46 and oscillates the inclined chute, as indicated by dotted lines in Fig. 3, and by full lines in Figs. 6 and 7. This oscillation of the coin chute 7 will also cause the holding jaw 14 to be moved to one side away from the disk 21 from the position shown in Figs. 4, 5 and 6, into the position shown in Fig. 7, thereby releasing its hold upon the coin that is resting between the disks on said jaw 14 and its companion jaw 15 and permitting it at the proper time to fall from between said disks into the coin chute 35. The position of the cam 48 is so arranged that this movement of the holding jaw 14 takes place some time after the disk 21 commences its rotation, so that the jaw 14 is not removed from its holding position until a portion of a revolution of said disk has taken place, and in the case of the presence of a genuine coin, after the companion disk 22 and auxiliary shaft 18 have also partially rotated; and hence the points 25 of the disk 22 will have had an opportunity to seat themselves in the depressions of the embossed surface of the genuine coin. The genuine coin and a spurious coin will, however, not be dropped from between the coupling disks until the pressure of the disk 22 or of its points 25 upon the surface of the coin ceases, which occurs upon the return movement of the frame 19 by the cam 34ª leaving the cam roll 34.

The auxiliary shaft and the disk 22 are returned after each revolution or partial revolution by a spiral spring 49 encircling the shaft as shown in Fig. 1. The rotary movement of the auxiliary shaft and disk 22 is limited in both directions by a pair of stops 50 carried by a disk 50ª forming a part of said shaft, and are positioned so as to limit the rotation to one hundred and eighty degrees or thereabout, and limiting the movement of the auxiliary shaft in each direction by one or the other stops 50 meeting the opposite sides of the arm 19ª. After the auxiliary shaft has been rotated or partially rotated and stopped by one of the stops 50, the spiral spring before referred to rotates the shaft back to its normal position.

The main shaft 17ª is prevented from backward rotation by a yielding detent 51ª carried by a pawl 51, see Fig. 14, the end of which pawl is slotted to receive a ratchet tooth 53, projecting from a collar on the shaft, which normally rests against said yielding detent. This collar is provided with a flat face 54 which is engaged by the adjacent surface of the pawl 51, the latter being held in firm contact with said flat face by a stiff spring 52.

It is obvious that the coin detecting mechanism so far described may be utilized to deliver any desired article or articles with which this coin detector may be associated; its application and use not being limited to any particular kind of vending machine or other automatic coin operated machine. The coin detecting devices are, however, illustrated with a delivering mechanism adapted to the vending of postage stamps, which outside of the particular means of holding such stamps and presenting them in succession in position to be delivered, the delivery mechanism now to be described may with slight modification be employed to deliver other articles in lieu of postage stamps.

The delivery mechanism is arranged to be operated only when a genuine coin is present in the machine inasmuch that at that time only is the auxiliary shaft 18 and disk 22 thereby caused to be operated; so that at all other times the delivery mechanism notwithstanding that the main shaft 17 may be rotated continuously, will either not be operated at all or will operate idly or incompletely and not effect the delivery of an article.

The delivering mechanism, see Figs. 4, 5, 9, 8 and 10, consists of a vibrating shaft 55 mounted on and between centers 56 supported at the upper end of a pair of standards 33. This shaft carries an arm 58 which extends in the path of a cam 59 on the auxiliary shaft 18 and forms with the cam the prime mover of the delivering mechanism and is herein termed the "operating arm." The shaft 55 is provided with another arm 60 extending in the path and adapted to be actuated by a cam 62 on the main shaft 17, and is arranged to depress the delivery device, which arm is herein termed the "carrying arm," that carries at its outer end a delivery arm 64. Another arm 65, fixed with respect to the delivery arm 64, is also pivoted to the carrying arm 63 and is held to duty by a spring 67 against a cam 66 on the main shaft 17. The arms 64 and 65 form a bell crank which is capable of being rocked independently of the carrying arm 63 by the spring 67 in one direction and by the cam 66 in the opposite direction. When the main shaft 17 is rotated in the absence of a genuine coin, the cams 62 and 66 are rotated, the cam 62 having no function to depress the depressing arm 60 on account of the arm being held in an idle position by the nonrotation of the cam 59 or in other words by the failure of operation of the operating arm; while the cam 66 in its rotation simply allows the arms 64 and 65 to vibrate under the pressure of the spring 67 from the position shown in Fig. 8 to that shown in Fig. 9, and back again, without effecting any delivery of the articles which the machine is designed to vend.

The arms 60, 63 and 58 are held in their normal idle position with the arm 58 resting upon the low part of the cam 59 by a spring 61.

Figure 8:
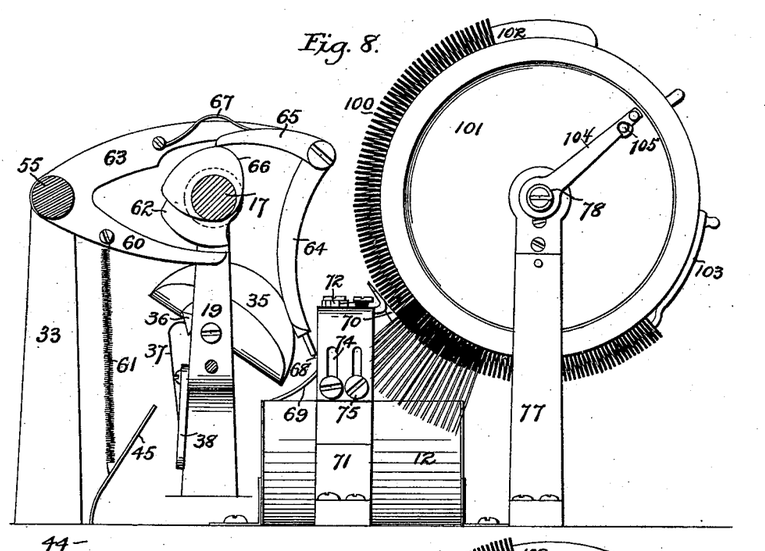
Fig. 8 is an irregular section taken on the line 8 8 of Fig. 5, showing particularly the devices for causing the delivery of the article vended by the machine, represented as postage-stamps, the said view being in the normal idle position of the parts.
Figure 9:
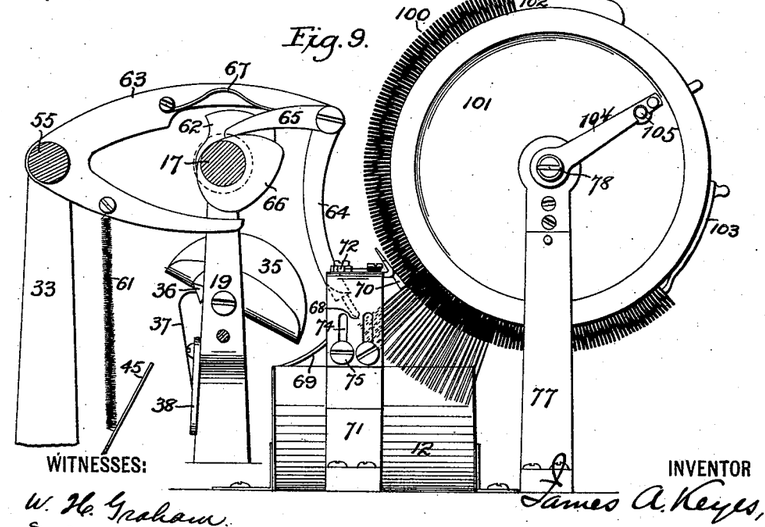
Fig. 9 is a similar view showing the mechanism after the operator has turned the crank nearly one hundred degrees of revolution in the absence of a proper coin or the absence of any coin in the coin-hopper.

To adapt the delivery arm 64 to deliver a pair of postage stamps at the proper time, its end is provided with a needle point 68, see Figs. 8 and 12, which is arranged to impale the pair of stamps in delivery position and carry them downward beneath a pair of stripping fingers 69 which strips the stamps from the impaling needle and permits them to fall into the hopper 12 and thence into the delivery drawer D.

The postage stamps in the present instance are carried by a carrier in the form of a spiral spring 100, (it may be a pair of spiral springs,) mounted in a curve upon the surface of a disk 101, that is mounted to turn in bearings in a standard or pair of standards 77. The coiled-spring carrier is fixed at one end 102 to the disk and at the opposite end is connected to a catch 103 adapted when moved or slid over the periphery of the disk not occupied by the spring to expand the coils of the spring to aid the more ready placing of the stamps in position in the spring. The pairs of postage stamps are inserted each pair between adjacent coils of the spring so that each pair of stamps is separated from the next adjacent pair by at least one coil of the spring. The stamps are arranged so that the uppermost pair of stamps is held against the lower end of a shield or stop 70 by the action of a spring 78 coiled about the shaft of the disk 101, acting upon a radial arm 104 which at its outer end engages a stud 105 on the disk 101.

The shield 70 is mounted at the upper end of a standard 71 and is adapted to be vertically adjusted by means of screws 75 which pass through slots 74 in the arm that carries the shield. This arm also carries a spring-pressed detent 72 which during the idle movement of the delivery arm 64, as in Fig. 9, prevents the needle point at the end of the arm from being vibrated sufficiently forward to impale a stamp, but is so arranged as to yield to permit the arm 64 to vibrate it to pass it as it returns to its normal position after impaling a stamp. When a genuine coin is in position and the cam 59 then acts upon the operating arm 58, the first action is to raise the arms 60, 63 and 64, so that upon the pressure of the spring 67 upon the arm 65, the arms 64 and 65 are rocked so that the lower end of the arm 64 is moved outwardly toward the stamp carrier 100, and the arms 60 and 63 continue to rise until the needle-point end of the arm 64 is raised over and projected upon the other side of the detent 72 and against the rear of the shield 70. This movement of the arm 64 is taking place during nearly one hundred and eighty degrees of revolution of the main shaft 17 and the cam 58 has left the arm 59 and returned to its original position by the backward oscillation of the auxilliary shaft 18, due to the action of the spring 49, thus allowing the arms 58, 60 and 63 to fall, owing to the pull of the spring 61, so that the delivery arm 64 is also lowered while in its outward position and its needle point carried to impale the uppermost pair of stamps present against the shield 70. In this position of the parts the spring 67 is holding the arm 65 against the cam 66. The cams 62 and 66 continuing to revolve, the cam 66 commences to slightly rock the arms 65 and 64, upwardly and inwardly respectively, while the cam 62 commences to depress the arms 60 and 63 downward to their fullest extent. While the cam is rocking the arm 64 and drawing it inwardly, its needle point is withdrawing the impaled stamps from between the coils of the spring carrier and finally carries them beneath the stripper fingers 69 which thereupon strip the stamps from the end of the needle point and allows them to fall into the hopper 12 simultaneous with the return of the parts to their original normal position, the shaft 17 having made a single complete revolution.

So far as those parts of the mechanism as have not been completely described, their operation is as follows:—The coin is dropped down the vertical chute 6, and the crank 16 is then turned by the intending purchaser. If the supposed coin is a counterfeit of some soft non-elastic metal, as lead, or has been so badly plugged as to loose its elasticity, it will fail to rebound over the partition 9 after it has struck the rigid base 8 and will lie inert and dead upon said base. The rotation of the crank 16 of the shaft 17 will cause the cam 48 to bear against the cam projection 46 on the end of the coin chute 7, and continuing in movement, said chute will be swung outward as indicated in dotted lines, Fig. 3, so that the discharging lip 47 will sweep the dead coin off said rigid base and drop it into the dead coin conduit 11 from which it will drop into the hopper 12, and thence into the delivery drawer D. There having been no coin passed into the inclined chute 7, no coin will be present in the coin coupler and hence the auxiliary shaft 18 will not be rotated and the delivery arm 64 will not have been moved into contact with a postage stamp, but will vibrate idly behind the detent pawl 72. Consequently, when the intending purchaser opens the delivery drawer D to get his postage stamps, he will find instead of postage stamps his counterfeit returned to him by the machine. Supposing, however, that the coin or substitute offered is of sufficiently elastic material to rebound over the partition 9, it then rolls down the inclined chute 7, and drops between the disks 21, 22. If it is of proper diameter it will be held between the jaws 14 and 15. If of smaller diameter it will fall through and into the tilting coin chute 35, which is normally tilted toward the dead coin hopper 12, and into the delivery drawer D. Thus it will be returned to the customer as above described and no goods delivered.

If the substitute be a metallic washer of the required diameter or a nickel worn smooth and thin, it will be held by the jaws 14 and 15, and gripped by the gaging points 25. The rotation of the crank shaft 17, accomplishes this through the cam 34ª and the cam roller 34 on the vibrating frame 19, causing the disks 21 and 22 to approach one another; but as the two shafts continue to rotate the winding up of the spring 49 presents a gradually increasing resistance to the rotation of the auxiliary shaft 18, and soon the gaging points 25, slip on the smooth surface of the washer, before the cam projection 39 has gotten round to strike pin 40, to reverse the tilting coin chute 35, and so when the cam roll 34 runs down off the raised portion of cam 34ª and the frame 19, moves back to the left, the thin coin or washer is dropped into the delivery drawer and the stamp delivering apparatus has failed to operate, as before. The coin is dropped from the coin coupler as above described because the jaws 14 and 15 are then side by side and can exert no retaining action on the coin, the jaw 15 then occupying the position normally occupied by the jaw 14, while the jaw 14 has been moved to one side on the outward oscillation of the coin chute 7 as before described.

If the coin is genuine, of the proper thickness and roughness of surface or embossed—characteristics of the particular denomination of coin selected to operate the vending apparatus,—it is gripped with sufficient force to give the auxiliary shaft a semi-revolution in unison with the main shaft 17. The coin chute 35, is tilted over by the finger 37 acting against the projection 40, so as to deliver the coin, when dropped, into the money drawer C. The cam 59 simultaneously lifts the operating arm 58, and with it the carrying arm 63, high enough to lift the delivery arm 64 above the detent pawl 72. The spring 67 forces down the arm 65 and throws the delivery arm in line with the stamps which are held up against the under edge of the shield 70. The continued rotation of the main shaft 17, causes the cam 62 to act on the depressing arm 61, after the auxiliary shaft 18 with its cam 59 have been released and turned back to their normal position by spring 49, and forces the needle point 67 into a pair of stamps, pulls them out of the carrier 100 and carries them under and against the stripper 69, by which they are pulled off or stripped and dropped into the delivery drawer D. During the last portion of the rotation of the crank the pawl 41 is struck by the pin 43 on the disk 21 and throws the tilting chute 35 back into its normal position, pointing toward the dead coin hopper.

It is understood of course that any other delivery apparatus than that shown herein, could be employed as well. The cams on the main shaft, however, are always arranged to do the heavy work of expelling the goods, while the cam on the auxiliary shaft does the light work of guiding the delivery arm so that it will expel an individual of the series of articles in the magizine when a good coin is dropped into the coin coupler, or so that it reciprocates idly without any effect whatever when the coin coupler fails to work.

Having therefore described my invention, what I claim as new, and desire to secure by Letters Patent, is—

1. In an apparatus for automatically separating spurious coins from genuine, the combination of a substantially vertical coin chute adapted to present the coin on edge, a rigid base or anvil below said chute, and a second coin chute, the entrance of which is above the plane of said base, into which the genuine coin may rebound edgewise from the rigid base, substantially as described.

2. In an apparatus for automatically separating genuine from spurious coins, the combination of a substantially vertical coin chute, adapted to present the coin on edge, a rigid base or anvil below said chute, the upper face of said base being inclined, and a second coin chute whose entrance is above the plane of said face and on the side toward which said face is inclined, substantially as described.

3. In an apparatus for automatically separating genuine from spurious coins, the combination of a substantially vertical coin chute adapted to present the coin on edge, a second coin chute at an angle to the first, a rigid base or anvil placed at the bottom of the first chute, and a partition closing the lower portion of the entrance to the second chute into which the genuine coin may rebound edgewise from the anvil, substantially as described.

4. In an apparatus for automatically separating genuine from spurious coins, the combination of a substantially vertical coin chute adapted to present the coin on edge, a rigid base below said chute, a second coin chute whose entrance is above the plane of said base, and a lateral discharge device for the dead coin which fails to enter the second chute, substantially as described.

5. In an apparatus for automatically separating genuine from spurious coins, the combination of a substantially vertical coin chute adapted to present the coin on edge, a rigid base below said chute, and a second coin chute whose entrance is above the plane of said base, and into which the genuine coin may rebound edgewise from the base, together with a discharge device for the dead coin which fails to enter the second chute, a money drawer into which the coin entering the second chute is delivered, and a delivery drawer in which the dead coin is deposited by the discharge device, substantially as described.

6. In an apparatus for automatically separating genuine from spurious coins, the combination of a substantially vertical coin chute, a second coin chute inclined at an angle to the first, and provided with a discharging lip, a rigid base placed at the bottom of the first chute, and a partition closing the lower portion of the entrance to the second chute, together with a hinged joint between said two coin chutes, a dead coin conductor below the rigid base, the delivery drawer into which said dead coin conductor discharges, and cam mechanism which oscillates said inclined chute upon its hinged joint, whereby any dead coin remaining upon the rigid base is swept off by the discharging lip and falls into the dead coin conductor, substantially as described.

7. In a vending apparatus, the combination of a coin operated delivery apparatus, a money drawer into which the coin drops after operating the delivery apparatus, a delivery drawer, an automatic coin separating apparatus, and chutes and conductors connected to the same whereby the genuine coin is carried to the coin operated delivery apparatus and ultimately to the money drawer, while the spurious coin is carried to the delivery drawer and returned to the customer, substantially as described.

8. In an apparatus for automatically determining a genuine from a spurious coin, the combination of a coin chute, a pair of coupling disks to which the coin chute leads and means for causing the disks to approach one another to grasp the coin between them, substantially as described.

9. In an apparatus for automatically determining a genuine from a spurious coin, the combination of a coin chute, a pair of coupling disks to which the coin chute leads means for positively moving one disk toward the other to grasp the coin, and a yielding connection permitting the disk to yield according to the thickness of the coin, substantially as described.

10. In an apparatus for automatically determining a genuine from a spurious coin, the combination of a coin chute, a pair of coupling disks to which the coin chute leads, a pair of grasping jaws for temporarily holding the coin, and means for causing the jaws to approach to grasp the coin, substantially as described.

11. In an apparatus for automatically determining a genuine from a spurious coin, the combination of a pair of coupling disks adapted to receive the coin between them, a crank for rotating one of the disks positively, friction engaging points for causing the other disk to rotate or partly rotate with the positively moved disk, and a spring for returning said second disk, substantially as described.

12. In a vending apparatus, the combination of the main shaft, the auxiliary shaft, the vibrating frame on which the auxiliary shaft is mounted, the coin coupling disks mounted on the adjacent extremities of the two shafts, the coin chute delivering a coin between said disks, the cam which causes the vibrating frame to move and the disks to clutch the coin, whereby the auxiliary shaft is coupled to the main shaft and the delivery apparatus guided by the action of the cam on said auxiliary shaft, substantially as described.

13. In a vending apparatus, the combination of the main shaft, the auxiliary shaft, the vibrating frame on which the auxiliary shaft is mounted, the coin coupling disks mounted on the adjacent extremities of the two shafts, the gaging points on said disks, the cam on the main shaft which causes the vibrating frame to move and the disks and gaging points to grip the cam if it is of the requisite thickness, the chute which delivers the coin between the disks, the coin holding jaw on the end of the coin chute and the second coin holding jaw on the disk on the main shaft, substantially as described.

14. In a vending apparatus, the combination of the main shaft, the auxiliary shaft, the vibrating frame on which the auxiliary shaft is mounted, the coin coupling disks mounted on the adjacent extremities of the two shafts, the coin chute which delivers a coin between said disks, the cam which causes the vibrating frame to move and the disks to clutch the coin whereby the auxiliary shaft is coupled to the main shaft, and the delivery apparatus guided by the action of a cam on said auxiliary shaft, together with the tilting coin chute beneath the disks, the money drawer at one end of said chute, the dead coin hopper at the other end of the chute, the cam projection on the auxiliary shaft by which the chute is tilted toward the money drawer, and the pawl and connections by which the complete revolution of the main shaft tilts the chute back toward the dead coin hopper, substantially as described.

15. In a vending apparatus, the combination of the main shaft, the auxiliary shaft, the vibrating frame on which the auxiliary shaft is mounted, the coin coupling disks mounted on the adjacent extremities of the two shafts, the coin chute which delivers a coin between said disks, the cam which causes the vibrating frame to move and the disks to clutch the coin, whereby the auxiliary shaft is coupled to the main shaft and the delivery apparatus guided by the action of a cam on said auxiliary shaft, together with the tilting coin chute beneath the disks, the money drawer at one end of said chute, the dead coin hopper at the other end of the chute, the cam projection on the auxiliary shaft by which the chute is tilted toward the money drawer, and the pawl and connections by which the complete revolution of the main shaft tilts the chute back toward the dead coin hopper, the cam tooth, an adjustable spring operating therewith for holding the chute in either position until positively moved by the mechanism above described, the spiral spring which rotates the auxiliary shaft backward after the coin has fallen from between the disks, and the stops which limit the rotation of said shaft, substantially as described.

16. In a vending apparatus, the combination of the hinged coin chute, the two disks of a coin coupling device beneath the delivery end of said chute, the coin holding jaw depending from the lower end of the chute, the revolving coin holding jaw formed on the face of the disk mounted on the main shaft, which jaw is opposite the other coin holding jaw when the main shaft is in its normal position of rest, the cam tooth on the swinging chute and the cam recess in the disk on the main shaft meshing therewith, whereby the depending jaw is caused to swing to one side out of the path of the revolving jaw, together with the cam mechanism whereby the two disks are caused to grip the coin held between the two jaws and retain the same until the revolving jaw has traveled through an arc of approximately one hundred and eight degrees, substantially as described.

17. In a vending apparatus, the combination of the main crank shaft, the auxiliary shaft, the coin coupler which temporarily couples said shafts together, a magazine of articles for sale, a reciprocating delivery arm, a cam on the auxiliary shaft and connections for guiding the motion of said delivery arm, and a cam on the main crank shaft for giving a positive thrust to said delivery arm for the purpose of expelling one by one the articles for sale when the delivery arm is properly guided to that end by the rotation of the auxiliary shaft in unison with the main shaft, substantially as described.

In testimony whereof I have hereunto set my hand, this 26th day of April, A. D. 1892, in presence of two witnesses.

JAS. A. KEYES.

Witnesses:
GEO. H. GRAHAM,
N. MARLER.